Figure 1:
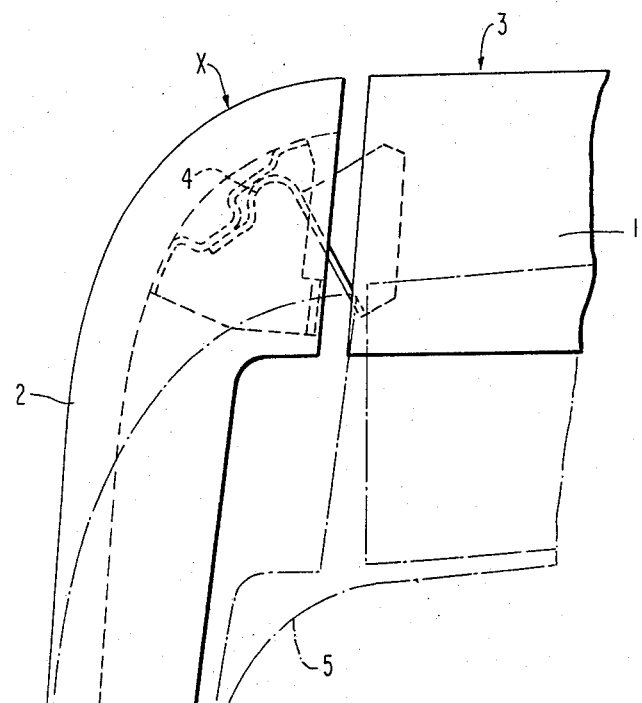

United States Patent [19]

Häberle et al.

[11] 3,861,728

[45] Jan. 21, 1975

[54] BUMPER FOR MOTOR VEHICLES

[75] Inventors: Fritz Häberle, Sindelfingen; Daniel Riechers, Calw-Heumaden; Walter Münsinger, Boblingen; Horst Kleiner, Stuttgart, all of Germany

[73] Assignee: Daimler-Benz Aktiengesellschaft, Stuttgart, Germany

[22] Filed: Aug. 28, 1973

[21] Appl. No.: 392,304

[30] Foreign Application Priority Data
Aug. 30, 1972 Germany............................ 2242666

[52] U.S. Cl...................... 293/62, 293/89, 293/99, 293/DIG. 5
[51] Int. Cl...................... B60r 19/04, B60r 19/08
[58] Field of Search ............ 293/62, 66, DIG. 5, 75, 293/76, 89, 99

[56] References Cited
UNITED STATES PATENTS

| | | |
|---|---|---|
| 1,544,613 | 7/1925 | Traver .................................. 293/62 |
| 1,548,087 | 8/1925 | Heller ............................ 293/DIG. 5 |
| 1,553,656 | 9/1925 | Williams ............................... 293/62 |
| 1,556,490 | 10/1925 | Chick.............................. 293/62 X |
| 1,605,584 | 11/1926 | Hoberecht ............................ 293/62 |
| 1,780,974 | 11/1930 | Hostutler ............................. 293/62 |
| 2,187,952 | 1/1940 | Rusche ................................ 293/62 |
| 2,329,808 | 9/1943 | Wolfe ............................ 293/DIG. 5 |
| 2,502,483 | 4/1950 | Sauer et al........................... 293/89 |
| 2,672,363 | 3/1954 | Buchanan ........................ 293/99 X |
| 3,782,768 | 1/1974 | Moore .............................. 293/62 X |

Primary Examiner—Robert S. Ward, Jr.
Attorney, Agent, or Firm—Craig & Antonelli

[57] ABSTRACT

A bumper for motor vehicles, especially passenger motor vehicles, which in case of an impact is displaced preferably in the vehicle longitudinal direction and which is equipped with lateral bent-around end portions extending approximately parallel to the outer surface of the body; the end portions of the bumper are thereby movably connected with the bumper center section and are longitudinally displaceably guided at a distance from the body.

10 Claims, 2 Drawing Figures

PATENTED JAN 21 1975

3,861,728

BUMPER FOR MOTOR VEHICLES

The present invention relates to a bumper for motor vehicles, especially for passenger motor vehicles, which in case of an impact is displaced preferably in the vehicle longitudinal direction and which is provided with lateral bent-around end portions extending approximately parallel to the outer surfaces of the body.

With passenger motor vehicles which are equipped in such a manner, there always exists the danger, especially in case of an obliquely directed impact, that the retracting or yielding lateral parts cause damages of the body. This may even lead so far that the lateral parts in the retracted condition of the bumper hook-in with associated body parts in such a manner that the bumper is no longer able to return to its original position as required after the impact.

It is the aim of the present invention to provide a possibility in order that bumpers with far bent-around end portions, in case of an impact, can move inwardly and after the end of the impact can again move outwardly unimpaired by any end portions colliding with body parts.

Consequently a bumper for motor vehicles, especially for passenger motor vehicles, is proposed which is displaced in case of an impact preferably in the vehicle longitudinal direction and which is provided with lateral bent-around end portions extending approximately parallel to the outer surfaces whereby according to the present invention the end portions are movably connected with the bumper center portion and are longitudinally displaceably guided at a distance from the body.

The lateral portions of the bumper may thereby be constructed shell-shaped and may consist of a synthetic plastic (resinous) material, for example, of integral foamed material of conventional type.

In one advantageous embodiment of the present invention, a spacer member projecting from the body engages into a guide rail mounted on the inside of the end portion of the bumper.

It may be appropriate if the connection between the end portions and the bumper center portion takes place by way of a spiral or bent spring.

However, it is also possible that a conventional hinge-like connection exists between the end portions and the bumper center section.

Accordingly, it is an object of the present invention to provide a bumper for motor vehicles, especially passenger motor vehicles, which avoids by simple means the aforementioned shortcomings and drawbacks encountered in the prior art.

Another object of the present invention resides in a bumper for motor vehicles, equipped with lateral bent-around bumper portions extending approximately parallel to the lateral body parts, which assures an unimpaired yielding and return movement of the bumper during and after an impact, respectively, without the danger of being prevented from doing so by some interengagement or interlocking with body parts.

A further object of the present invention resides in a bumper of the type described above which assures a reliable operation as regards its yielding function regardless of the impact direction against the bumper.

Figure 2:
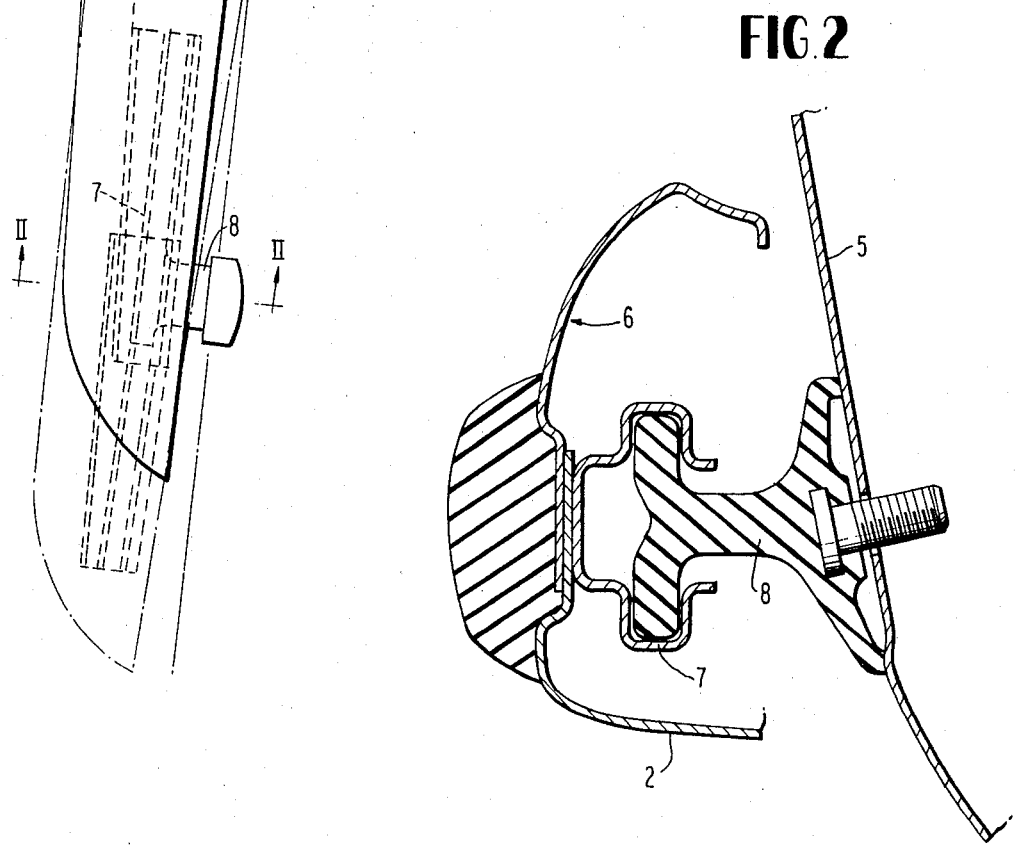

These and other objects, features and advantages of the present invention will become more apparent from the following description when taken in connection with the accompanying drawing which shows, for purposes of illustration only, one embodiment in accordance with the present invention, and wherein:

FIG. 1 is a partial plan view on a corner area of a bumper according to the present invention, and FIG. 2 is a cross-sectional view taken along line II—II of FIG. 1.

Referring now to the drawing wherein like reference numerals are used throughout the two views to designate like parts, a bumper generally designated by reference numeral 3 which consists of a bumper center section 1 and of lateral bumper portions 2 movably adjoining the center section 1 on both sides thereof, is adapted to give way in case of an impact, for example, by means of shock absorbers, in a manner known as such and therefore are not illustrated herein; the bumper 3 thereby forms the forward and/or rearward termination of a motor vehicle not illustrated in detail. In FIG. 1 the movable connection of the bumper center section 1 with each lateral part 2 consists of a bent spring 4.

The end portion 2 which extends in each case approximately parallel to the outer surface of the body 5, is provided on its inner side generally designated by reference numeral 6 with a guide rail 7, into which engages a spacer member 8 rigidly connected with the body 5. The spacer member 8 which may consist either of synthetic plastic material of any conventional type or of metal, remains at rest relative to the bumper 3 during the retraction.

The retracted condition of the bumper 3 is indicated in FIG. 1 in dash and dot line and shows that with an impact taking place in the direction of arrow $x$, no abutment of the end portion 2 takes place and therewith also no damage of the body 5 takes place. Similarly, after termination of the impact an effortless return of the bumper 3 into its original position is possible.

A hinge-like connection may exist in a manner not shown between the bumper center section 1 and the lateral portions 2 which, for example, can also be achieved in that lateral portions made of integral foamed material of any conventional type, are rigidly connected with the bumper center section 1 whereby the movability remains preserved by the inherent elasticity of the integral foamed material, for example, of integral synthetic resinous foamed material of known type.

The integral foam material has the specific property that the element made therefrom forms a surface or skin free from gas occlusions so that such gas occlusions will be found only toward the interior of the element. Integral foam material has a relatively high density (0.6 – 0.8 in proportion to water) and is relatively hard. It is made up of two or more components, the main component being polyurethane. The components are sprayed into a mold during the manufacture in which the mass foams up during the blending and hardens fully due to heat.

While we have shown and described only one embodiment in accordance with the present invention, it is understood that the same is not limited thereto but is susceptible of numerous changes and modifications as known to those skilled in the art and we therefore do not wish to be limited to the details shown and described herein but intend to cover all such changes and

What we claim is:

1. A bumper for motor vehicles which is displaced in case of an impact and which includes a center section and lateral bent-around end portions extending approximately parallel to the outer surface of the body, characterized in that the end portions are movably connected with the center section and are substantially longitudinally displaceably guided at a distance from the body by a guide means, and in that said guide means include a spacer means projecting from the body which spacer means engages in a guide rail means mounted on the inside of each bumper end portion, and further characterized in that the connection between the end portions and the center section takes place by bent spring means.

2. A bumper for motor vehicles which is displaced in case of an impact and which includes a center section and lateral bent-around end portions extending approximately parallel to the outer surface of the body, characerizied in that the end portions are movably connected with the center section and are substantially longitudinally displaceably guided at a distance from the body by guide means, and in that said guide means includes a spacer means projecting from the body which spacer means engages in a guide rail means mounted on the inside of each bumper end portion, and further characterized in that a hinge-like connection exists between the end portions and the center section.

3. A bumper for motor vehicles which is displaced in case of an impact and which includes a center section and lateral bent-around end portions extending approximately parallel to the outer surface of the body, characterized in that the end portions are movably connected with the center section and are substantially longitudinally displaceably guided at a distance from the body by guide means, and in that said guide means include a spacer means projecting from the body which spacer means engages in a guide rail means mounted on the inside of said bumper end portion, and further characterized in that the bumper is displaceable in the longitudinal direction.

4. A bumper according to claim 3, characterized in that the connection between the end portions and the center section takes place by bent spring means.

5. A bumper according to claim 3, characterized in that a hinge-like connection exists between the end portions and the center section.

6. A bumper according to claim 3, characterized in that the movable connection between the center section and the end portions is realized by the inherent elasticity of the material from which the end portions are made.

7. A bumper according to claim 6, characterized in that said material is integral foamed material.

8. A bumper according to claim 7, characterized in that said integral foam material has a main component of polyurethane.

9. A bumper according to claim 3, characterized in that said spacer means is rigidly connected with the body.

10. A bumper according to claim 9, characterized in that said spacer means is one of a synthetic plastic material and a metal.

* * * * *